United States Patent [19]

Croopnick et al.

[11] Patent Number: 4,608,319

[45] Date of Patent: Aug. 26, 1986

[54] EXTENDED SURFACE AREA AMORPHOUS METALLIC MATERIAL

[75] Inventors: Gerald A. Croopnick, Trabuco Cyn; David M. Scruggs, San Juan Capistrano, both of Calif.

[73] Assignee: Dresser Industries, Inc., Dallas, Tex.

[21] Appl. No.: 649,070

[22] Filed: Sep. 10, 1984

[51] Int. Cl.[4] .......................... C22F 1/00; C21D 9/00; C23F 1/00; B01J 32/00
[52] U.S. Cl. .................................. 428/613; 148/13.1; 148/13.2; 148/14; 148/403; 156/656; 502/439
[58] Field of Search ................. 148/3, 403, 13.1, 13.2, 148/14, 158, 159, 160, 162, 39; 428/613, 687; 502/439; 156/656

[56] References Cited

U.S. PATENT DOCUMENTS

| | | | |
|---|---|---|---|
| 2,106,744 | 2/1938 | Hood et al. | 106/36.1 |
| 2,215,039 | 9/1940 | Hood et al. | 49/79 |
| 2,221,709 | 11/1940 | Hood et al. | 106/36.1 |
| 2,286,275 | 6/1942 | Hood et al. | 49/79 |
| 2,755,237 | 7/1956 | Turner | 428/687 |
| 3,434,827 | 3/1969 | Lemkey | 428/613 |
| 3,594,292 | 7/1971 | Russel et al. | 428/613 |
| 3,615,900 | 10/1971 | Lee | 156/656 |
| 3,775,176 | 11/1973 | Cross et al. | 117/227 |

FOREIGN PATENT DOCUMENTS

10?242 7/1982 Japan .................................. 428/613
2075551 11/1981 United Kingdom .

*Primary Examiner*—L. Dewayne Rutledge
*Assistant Examiner*—John J. Zimmerman
*Attorney, Agent, or Firm*—Gregory O. Garmong

[57] ABSTRACT

An extended surface area amorphous metallic article and process for preparation thereof, wherein a homogeneous amorphous metallic alloy is phase-separated to produce two interconnected, internally continuous, amorphous phases, and then one phase is removed. Preferably, the homogeneous metallic alloy has a composition associated with a eutectic between at least two solid solutions. Phase separation is accomplished by exposing the alloy to a temperature which is below the crystallization temperature and also below the phase separation temperature for that composition. Removal of one phase may be accomplished by leaching in a liquid solution, or by vaporization. The resulting article has an extended surface area of the amorphous phase that is not removed. A porous membrane having extended internal surface area may be prepared by continuing the removal process to the removal of one phase throughout the entire thickness of the article. The extended surface area articles, wherein the extended surface area is of an amorphous metal, enjoy particular advantages when used as catalysts.

13 Claims, 7 Drawing Figures

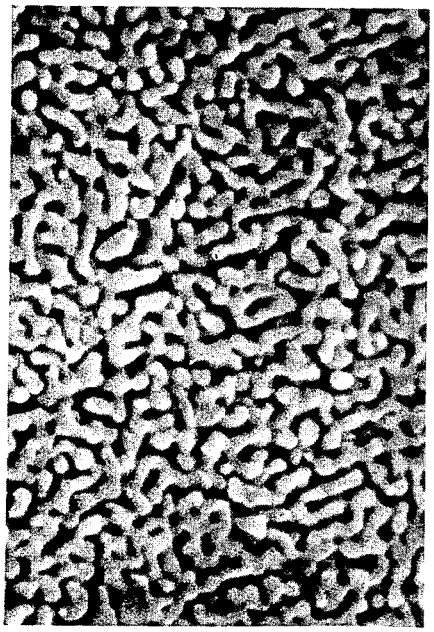
Fig. 4  1 micron
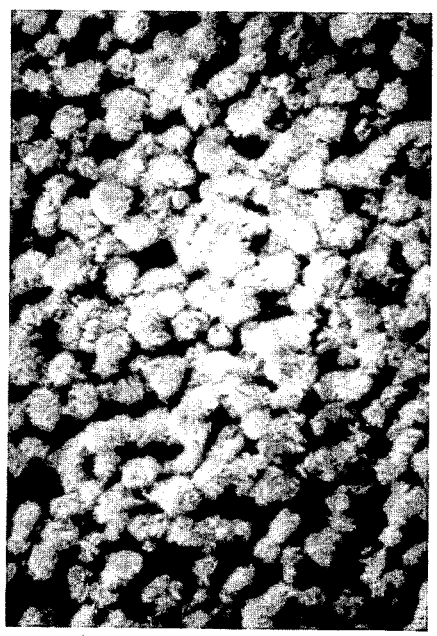
Fig. 5  10 microns
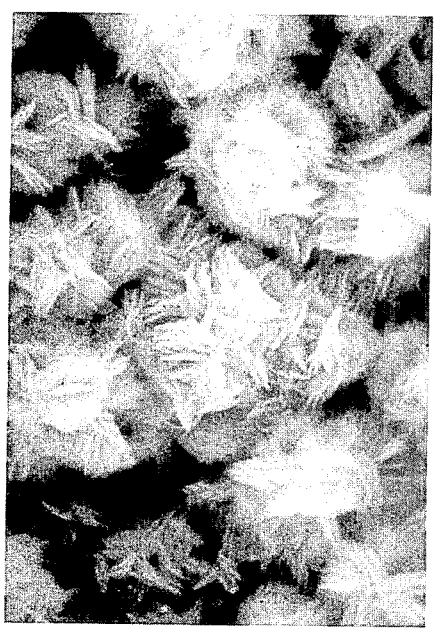
Fig. 6  1 micron
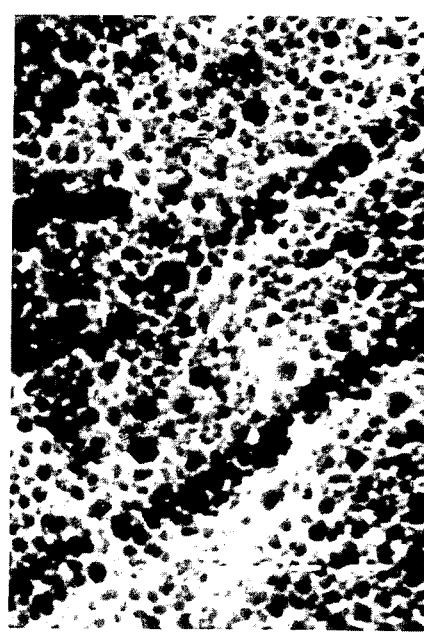
Fig. 7  10 microns

EXTENDED SURFACE AREA AMORPHOUS METALLIC MATERIAL

BACKGROUND OF THE INVENTION

This invention relates to amorphous metallic materials, and, more particularly, to an amorphous metallic article having an extended surface area.

The exact morphology of the surface of a solid plays a key role in determining many of its properties. For example, strength, corrosion resistance, ability to be joined to other materials, and electrical and magnetic properties can all be dependent upon the characteristics of surfaces, as can many other properties. The total area of surface present is also important, as the rate of a reaction involving a metal may be limited by the total contact area between the metal and a reactant.

A catalyst is a metal or other material that aids in the accomplishing of a chemical reaction, without itself entering into the chemical reaction. As an example, platinum catalysts are utilized in automobile catalytic converters to transform polluting gasses to less harmful gasses. Two characteristics of catalysts, their total surface area and the atomic configuration of the surface, often determine and control their success in promoting a reaction. It is generally preferred that a maximum amount of surface area be available, and therefore catalysts are often provided in the form of very fine particles having a large surface-to-volume ratio. It is also observed that the precise arrangement of the atoms on a surface and the interatomic spacing of the atoms can influence catalysis, and in particular some crystallographic planes of crystalline catalysts are more effective than others in promoting catalysis.

In recent years, it has been recognized that amorphous, or non-crystalline, materials can promote catalysis. The metallic atoms in an amorphous material exhibit no long-range order, and therefore the atoms are not arranged on a crystallographic lattice. It is believed that this lack of crystallographic arrangement imparts improved catalytic properties to the material. Since amorphous materials of various potentially useful compositions can now be formed by known techniques, there has developed a need for amorphous materials in forms having large amounts of surface area per unit volume.

Amorphous materials are often formed as small particles, usually spherical in shape, by rapid quenching from the melt. While these particles inherently have relatively high surface-to-volume ratio, they are often inconvenient to handle in a bulk form and necessitate the use of complex container arrangements to allow contact between the amorphous material and the chemical reactants, when the amorphous material is to be used as a catalyst. Other approaches to preparing amorphous materials, such as the solidification of ribbons, electrodeposition, vapor deposition, or sputtering result in pieces of amorphous material which are more easily handled but which do not have the desired high surface area.

In another approach directed toward providing a catalyst, it has been proposed to prepare a hybrid amorphous material having regions of a local order non-equilibrium structure, and then to preferentially remove the atoms in these regions which are at a surface. This technique is said to produce a roughening of the surface, thereby increasing the surface area by a relatively small amount and modifying the atomic structure at the surface. This approach does not produce an extended three-dimensional structure having internal passageways for extensively increased surface area.

Accordingly, there exists a need for amorphous materials having extended surface areas to produce a high surface-to-volume ratio, but which are monolithic and therefore do not require special containment systems or are in finely divided form. A variety of applications can be envisioned for such materials, including, for example, catalysts and membranes used as filters or in osmosis. The present invention fulfills this need, and further provides related advantages.

SUMMARY OF THE INVENTION

The present invention provides a monolithic or finely divided amorphous article having extended surface area, and a process for its preparation. This high surface area amorphous article may be prepared in a plate-like form so that the extended surface is located primarily near the gross surface of the article, or in a membrane form so that the extended surface area is found substantially throughout the entire thickness of the piece. In either form, passageways extend into the material so that external reactants may penetrate to contact large amounts of surface area. A wide variety of amorphous materials suitable for fabrication into the extended surface area form may be prepared by conventional techniques, for subsequent processing as described herein.

In accordance with the invention, a piece of a homogeneous, solid solution amorphous metallic alloy is first prepared, the article having a composition associated with a eutectic reaction in a binary or higher order system. This homogeneous alloy is then separated into at least two distinct yet interconnected phases within the body of the piece, the phases each being internally continuous, amorphous and in communication with the surface of the piece, by exposing the homogeneous alloy to a temperature which is below the crystallization temperature of the composition and is also below the phase separation temperature of the composition. After the phase separation is accomplished, one of the phases is removed, thereby exposing to the ambient environment an increased amount of surface of the remaining amorphous phase.

The metallic starting article should have a composition which is associated with a eutectic reaction between at least two solid phases, so that a phase separation reaction can occur in the multiphase region of the phase diagram below the eutectic temperature, in the absence of nucleation and growth. Such a phase separation is generally termed a spinodal reaction. Examples of some potentially important catalytic alloy systems which meet this basic material requirement include aluminum-silver, copper-zirconium, and nickel-palladium-phosphorus alloys. Compositions associated with the eutectic reactions in these systems can be prepared in ribbon or other forms by rapidly quenching these compositons from the liquid state at cooling rates of greater than about $10^5°$ C. per second or by other techniques such as electroplating.

Phase separation is accomplished at a temperature which is below the crystallization temperature and also below the phase separation or spinodal temperature for the particular composition selected, with both the crystallization and spinodal temperatures being readily determinable by simple measurements if not previously known. The phase separation step causes the previously homogeneous structure to decompose into at least two phases, each of which is microscopically distinct yet interconnected with the other phases, and each of which is internally continuous in the sense that it would be possible to connect any point of a phase with any other point of the same phase without crossing a phase boundary. This internal continuity is particularly important, because the phase remaining after removal of one phase must have sufficient continuity and strength so that it does not collapse under its own weight. Additionally, removal of a phase is practical only if that phase exhibits internal continuity so that atoms being removed can find a path out of the article.

The preferred approach to removing all or part of one phase is to leach the phase-separated piece in a liquid environment which attacks and dissolves the phase which is to be removed, but does not substantially influence the remaining phase. With this approach, removal of amorphous material near a gross surface of the piece proceeds rapidly, but as the depth of removal increases, the rate of removal slows. Nevertheless, it is often possible to remove one phase through the entire thickness of the article, thereby forming a porous membrane. Other phase-removal techniques include, for example, vaporization or sublimation of a phase, either with or without a prior reaction to accelerate phase removal.

When liquid, gaseous or solid contacting media are brought into contact with the article of the invention, either at a surface or by being forced through a membrane of this material, the liquid, solid or gas is exposed to a large surface area of the remaining amorphous phase. Under the proper conditions, this intimate contact can result in catalysis of a reaction between components in the contacting medium, or other beneficial results of the extended surface area.

It will be appreciated that the present invention provides an important advance in the field of extended surface area materials. Single, monolithic pieces of materials having large surface areas of an amorphous metal may be prepared from homogeneous amorphous alloys by heat treating and metal removal procedures such as leaching. The extended surface area amorphous materials may then be used without further processing in catalysis and other reactions. Other features and advantages will become apparent from the following more detailed description, taken in conjunction with the accompanying drawings, which illustrate, by way of example, the principles of the invention.

BRIEF DESCRIPTION OF THE DRAWINGS

FIG. 4 is a scanning electron micrograph of the surface of an aluminum-silver extended surface area material, with the aluminum-deficient phase removed;

FIG. 5 is a scanning electron micrograph of the surface of a copper-zirconium extended surface area material, with the zirconium-rich phase removed;

FIG. 6 is a scanning electron micrograph of the surface of the same material as shown in FIG. 5, except at a higher magnification; and FIG. 7 is a scanning electron micrograph of the surface of a phase separated nickel-palladium-phosphorous extened surface area material with the nickel-rich phase removed.

DETAILED DESCRIPTION OF THE PREFERRED EMBODIMENT

Figure 1:
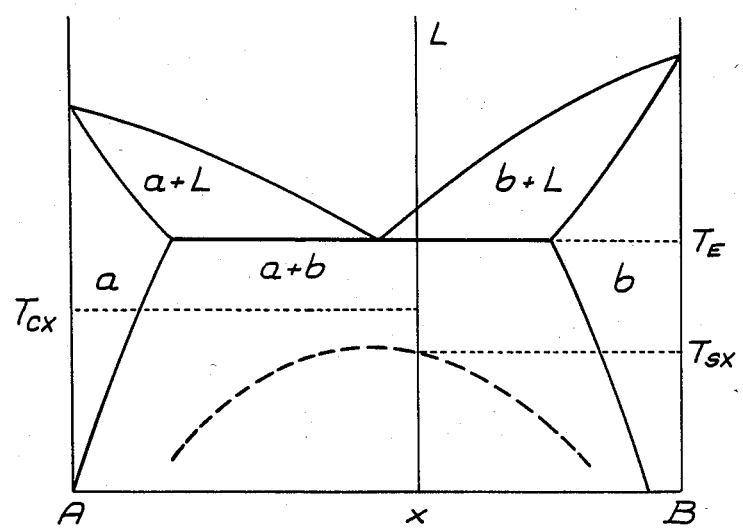
FIG. 1 is a phase diagram of a two component alloy system, illustrating a preferred composition range of an amorphous alloy for use in the present invention.

In accordance with a preferred embodiment of the invention, an alloy having a eutectic or near-eutectic composition is prepared in a homogeneous, solid solution amorphous metallic form, as by quenching a stream of the liquid metal against the surface of a rapidly turning wheel. This homogeneous amorphous alloy is separated into two phases at a temperature which is below both the phase separation temperature and the crystallization temperature of the particular alloy composition selected. In some instances, this phase-separation temperature is ambient temperature, and in other instances heating to elevated temperature is required. The metallic structure resulting from the phase separation step is a multiphase metallic material, having at least a first internally continuous, amorphous phase, the first phase communicating with the gross surface of the article and extending throughout the volume of the material, and a second internally continuous, amorphous phase, the second phase communicating with the gross surface of the material and extending throughout the volume of the material.

An extended surface area article is then prepared by removing one of the phases, as by leaching the phase-separated material in a liquid environment which attacks one phase but not the other. Leaching may continue for a relatively brief time, to form an article having extended surface area only near the gross surface of the piece. Alternatively, the leaching may continue for extended periods of time to remove all of one phase through the entire thickness of the piece, thereby forming a porous membrane. In either case, the resulting multiphase article comprises at least a first internally continuous, amorphous metallic phase, the first phase communicating with the gross surface of the article, and a second internally continuous liquid or gaseous phase, the second phase communicating with the gross surface of the article. In the case where leaching is relatively brief so that only part of one solid phase is removed, then the unleached remainder of this solid phase will also be present.

The piece of homogeneous amorphous alloy, which subsequently is phase separated and treated for removal of one phase, is produced by any of several techniques known in the art. In the preferred approach, the piece is prepared by melting a liquid metal mass of the desired composition, and then achieving rapid solidification to a homogeneous, amorphous state by projecting a stream of the liquid metal against the rim of a revolving metal wheel, to produce a ribbon of the solidified amorphous material. The ribbon is typically about 0.003 inches thick, 0.100 inches wide and of indefinite length. The broad faces of the ribbon are ideally suited for use as extended surface area articles, after the subsequent separation steps are completed. That the structure of the ribbon is homogenous and amorphous may be verified by X-ray diffraction and transmission electron microscope determination. The ribbon quenching technique is further described in U.S. Pat. No. 4,282,921, whose disclosure is herein incorporated by reference.

The composition of the amorphous material is selected both for its suitability for its ultimate intended use, and also for its processing characteristics. The suitability of particular alloys for intended uses is discussed subsequently in relation to the Examples, and the suitability of processing characteristics of amorphous materials will be discussed in relation to FIG. 1. FIG. 1 is a schematic phase diagram of a binary eutectic reaction between two solid components A and B, of which either or both may be a solid solution. As shown in FIG. 1, A has a solid solution range a and B has a solid solution range of b. An alloy having a composition of X cooled slowly from the liquid state into the two phase region a+b normally transforms into a multi-phase structure containing a phase and b phase by a nucleation and growth process, resulting in partial or complete crystallization of the structure.

An alloy X rapidly cooled to low temperature within the a+b region may retain its amorphous structure from the liquid state. When such an amorphous alloy is then reheated to a temperature less than the eutectic temperature $T_E$, that is, within the a+b field, several reactions are possible. If the temperature of reheating is less than $T_E$, but greater than $T_{CX}$, the crystallization temperature for that alloy composition X, then the entire amorphous structure crystallizes. Where the amorphous alloy is heated to a temperature less than $T_{CX}$, but greater than the phase separation or spinodal temperature for that alloy, $T_{SX}$, phase separation by nucleation and growth is expected. This reaction also results in a crystalline structure in the phases. However, if the alloy is heated or otherwise exposed to a temperature less than the phase separation or spinodal temperature $T_{SX}$ for that alloy composition X, a phase separation occurs, into an A-rich phase and an A-deficient phase (or, alternatively stated, a B-deficient phase and a B-rich phase.)

The phase separation step of the process for producing the morphology of the present invention must be accomplished below the crystallization temperature $T_{CX}$ and also below the spinodal temperature $T_{SX}$ for the particular alloy composition X. If not already known, the crystallization temperature for any particular amorphous alloy may be readily determined by heating a series of samples to successively greater temperatures and then examining the samples by X-ray diffraction to determine whether crystallization has occurred. Crystallization typically occurs substantially throughout the entire volume of the material upon reaching the crystallization temperature $T_{CX}$.

While not wishing to be bound by any particular theory, it is believed that phase separation without nucleation and growth occurs by spinodal decomposition.

The spinodal temperature $T_{SX}$ is defined by a spinodal decomposition curve (dashed in FIG. 1) within the multiphase region. Briefly, spinodal decomposition is found when the second derivative of the free energy as a function of composition is negative, which occurs in the central portion of the two-phase field between two solid phases. In this spinodal region, the homogeneous amorphous alloy can achieve a reduced free energy by a spatially periodic decomposition into two solid solutions. This phase decomposition occurs without a nucleation and growth phenomenon, and therefore without crystallization. To achieve the desired phase-separated amorphous structure, the phase separation must occur at a temperature below the spinodal temperature $T_{SX}$.

If not already known, the spinodal temperature $T_{SX}$ may be determined either theoretically from free energy data, or experimentally for a particular alloy composition by reheating samples of the amorphous composition to a succession of increasing temperatures, and observing the structure by X-ray and electron microscopy. If the sample is heated to a temperature less than $T_{SX}$, the X-ray pattern exhibits an amorphous rather than a crystalline structure, even though two decomposed phases are present. Similarly, an electron microscope diffraction pattern shows an amorphous structure in the phases rather than a crystalline structure. The electron microscope image shows a generally spatially regular multiphase structure. Conversely, if the material is heated to a temperature greater than $T_{SX}$, the X-ray and the electron diffraction patterns include a diffraction spot pattern characteristic of a crystalline structure. The electron microscope image then exhibits a more irregular two-phase array characteristic of random nucleation and growth.

Combining the descriptions of the preceding paragraphs, it is possible with a single set of measurements to determine the temperature range wherein a phase separation in accordance with the present invention has been successfully accomplished. If each of a series of samples is heated to successively higher temperatures, the upper limit of the phase separation temperature for practicing the present invention is reached when a sample first exhibits a crystalline X-ray pattern and electron diffraction spot pattern, or when the image shows a microstructure characteristic of nucleation and growth.

It is preferred that the eutectic between the solid solutions be centrally located, rather than being located near the extreme ends, and that the composition of the amorphous alloy be associated with such a central eutectic. The spinodal region is broadest and operationally most easily accessible in the multiphase region beneath a central eutectic. When the eutectic is located at either high or low compositions between the two solid phases, the spinodal region tends to be more irregular and narrower, and displaced from the near-eutectic compositions whereat amorphous structures are most readily formed. Thus, while non-central eutectics may be operable, in such systems selection of particular alloy compositions is more tightly restricted in achieving an initially amorphous, homogeneous structure, and then a phase-separated inhomogenous structure wherein the phases are amorphous.

A central eutectic is also preferred for the reason that compositions associated with central eutectics have a greater likelihood of producing at least two internally continous phases in the phase-separation procedure. At least two phase-separated phases should be internally continuous in order that the removal step can be accomplished and also so that the resulting structure has sufficient structural integrity and strength for subsequent use. As the term is used herein, an internally continuous phase is one wherein it would be possible to connect any point of a phase with any other point of the same phase without crossing a phase boundary. The phase to be removed should be internally continuous and communicate with the gross surface of the piece, as there must be a path from points within that phase to the gross surface during the removal process. For example, if removal is accomplished by leaching, the leach liquid must have a passageway into the piece to attack the remaining phase to be removed. Although isolated pockets of the phase to be removed may remain after phase removal, a major portion of the phase to be removed may not be located in isolated pockets within the phase that is to remain. Conversely, a major portion of the phase that is to remain cannot be isolated in pockets within the phase to be removed, as such isolated pockets would also be removed or would remain in the structure but give no structural stength. Such structures wherein one phase lies in isolated pockets within the other phase are typically found in relation to non-central eutectics, although some exceptions may exist. For both of the reasons stated, it is preferable that the amorphous composition chosen be associated with a central eutectic, the composition preferably being eutectic or near-eutectic.

The temperature of phase separation may be varied to achieve particular structures, as long as the temperature is below both the crystallization temperature $T_{CX}$ and the phase separation or spinodal temperature $T_{SX}$. Relatively low temperatures meeting both of these criteria produce spacing and thicknesses of the phase-separated phases which are relatively smaller, as the lower temperatures have low solid state diffusion rates. Higher temperatures meeting the two criteria tend to produce larger phase spacing and thicknesses, due to the greater diffusion rates. In all instances, and as will be seen in relation to FIGS. 4–7, the phase thicknesses and spacing are about one micron or less in size, and often on the order of about 0.1 micron. No other technique is known to produce such fine microstructural morphology. Although the low phase-separation temperatures produce higher surface-to-volume ratios in the final article, in many instances it is preferable to accept a lower surface-to-volume ratio with a slightly coarser structure, since the finest structures may be so fine that phase removal of one phase becomes very difficult and lengthy.

Removal of one phase may be accomplished by any suitable technique, but is preferably accomplished by leaching of one pahse by a liquid medium which attacks and dissolves one phase but not the others. This removal approach is based in different chemical activities of the separated phases. Other removal approaches are also possible. For example, when the phase to be removed has a significantly greater vapor pressure at elevated temperature than the phase which is to remain, the phase-separated piece may be heated in vacuum, so that the phase to be removed vaporizes and is drawn out of the piece. The phase to be removed could also be reacted with a reactant so that the reaction product sublimes, or could be oxidized to a volatile oxide, for example.

Figure 2:
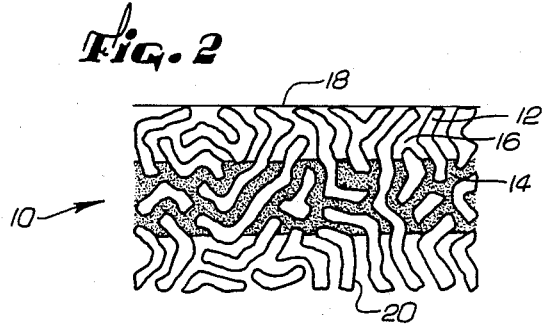
FIG. 2 is a schematic side sectional view of an extended surface area amorphous material, after partial removal of one phase.

In removing a phase by leaching, the appropriate leaching liquid is first prepared. The composition of the leach liquid is specific to particular phases to be removed, as will be indicated in relation to the Examples presented below. The leach liquids are commonly acidic or alkaline liquids. Electrolytic etches can also be used. The phase-separated piece from which one phase is to be removed is placed into the liquid, and dissolution and removal are allowed to proceed to the extent desired. The phase to be removed is dissolved and removed most rapidly from the region adjacent the microscopically observable or gross surface of the piece, as indicated in FIG. 2. With increasing depth of removal, the removal process becomes slower due to the need to diffuse fresh leaching fluid into the piece and diffuse the dissolved matter out of the piece. It is therefore preferred to accelerate the diffusion as much as possible, preferably by agitation of the leaching liquid or the piece of phase-separated material, or both. Heating accelerates the removal process, but heating may also cause further solid state phase separation, and therefore the application of heat must be done with caution.

Figure 3:
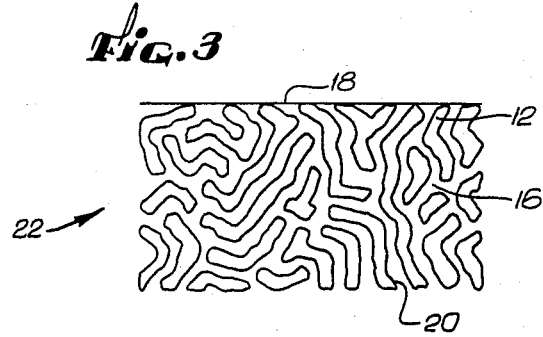
FIG. 3 is a schematic side sectional view of an extended surface area amorphous material, after complete removal of one phase to form a porous membrane.

The phase removal process may be continued only for a period of time sufficient to remove one phase immediately adjacent the gross surface of the piece, as illustrated in FIG. 2, or may be continued until substantially all of the phase to be removed has been removed throughout the entire thickness of the piece, as illustrated in FIG. 3. Referring to FIG. 2, a piece 10 of material which has been previously phase separated includes a first solid phase 12, which is substantially not attacked by the selected leaching liquid, a second solid phase 14 which is attacked by the leaching liquid and is illustrated as being partially removed, and a liquid or gaseous phase 16 which replaces the second solid phase 14 as it is removed. The gross surface 18 of the piece 10 is the surface which would be observed macroscopically. Keeping in mind that the spacing between the individual pieces of the first phase 12, and the thickness of each of these phases, is on the order of one micron or less this spacing cannot be observed with the naked eye. The piece 10 therefore appears to the naked eye to be solid, which it is prior to leaching. The observable surface of this solid is termed the gross surface 18. The gross surface 18 is to be distinguished from the exposed surface 20, which is the total area of the first phase 12 that is exposed to the environment. The area of the exposed surface 20 is typically many times greater than that of the gross surface 18. There are many applications wherein removal of only part of the second phase 14, as illustrated in FIG. 2, is sufficient, since any reaction occurs most rapidly in the regions of exposed surface 20 adjacent the gross surface 18 because this area is most accessible to reactants in the external environment. Nevertheless, one phase may be removed to indefinitely large depths, because of the internal continuity of the phases.

In other applications, it may be desirable that reactants in the external environment should pass completely through the article made in accordance with the invention, as where the article is to act as a membrane, or a catalyst or reactive filter. A porous membrane stucture 22, as illustrated in FIG. 3, may be prepared by continuing the removal or leaching process described previously until substantially all of the second phase 14 is removed. As indicated previously, metallurgical structures typically have sufficient irregularities that small volumes of the second phase 14 may not be removed, but such irregularities do not interfere with the operability of the article. Even when substantially all of the second phase 14 is removed, the membrane structure is continuous and of sufficient mechanical strength to retain its shape and structural integrity as a single solid or monolithic piece. The strength derives from the fact that the alloy composition associated with a eutectic phase separates into at least two internally continuous phases, and that the phase not removed is integral.

After the removal process is accomplished, any traces of the leaching liquid or other substance used to remove one phase are thoroughly cleaned away, and the article is then finished.

The following Examples are presented to illustrate aspects of the invention, but should not be taken as limiting the invention in any respect.

EXAMPLE 1

An aluminum-silver amorphous alloy was prepared as a ribbon in the manner previously described, with the composition of the alloy 37 weight percent aluminum—63 weight percent silver. (All compositions stated herein are by weight, unless otherwise indicated.) After the piece of ribbon was prepared, it was held at ambient temperature for 4 days to accomplish phase separation of an aluminum-rich phase and an aluminum-deficient phase. The two phases of the phase separated sample were found to be fully amorphous under X-ray diffraction examination. Next, substantially all of the aluminum-deficient phase was removed by leaching in a concentrated nitric acid solution at ambient temperature, to produce a porous membrane. The finished article was examined in a scanning electron microscope, and FIG. 4 illustrates the resulting microstructure. The remaining aluminum-rich phase is in the form of irregular lamellae and it may be deduced that the aluminum-rich phase is internally continuous in view of the structural integrity of the monolithic piece. The width of the irregular lamellae is about 0.1 microns, and the spacing between the lamellae is slightly less.

EXAMPLE 2

An aluminum-silver amorphous alloy was prepared as described for Example 1, except that the phase-separated piece was placed in concentrated potassium hydroxide leaching solution rather than nitric acid. The potassium hydroxide removed the aluminum-rich phase, leaving the aluminum-deficient phase. All of the aluminum-rich phase was removed, leaving a porous membrane formed of lamellae of the aluminum-deficient phase. The appearance of the resulting structure is similar to that of FIG. 1, except that the phase removed with potassium hydroxide is the phase untouched by nitric acid. The ability to separately remove the two phases further demonstrates that the phases are internally continuous. Silver catalysts are widely used in oxidation of ethylene to produce ethylene oxide, and good selectivity in this process is highly important. It is believed that an extended surface area porous membrane catalyst as produced by the present invention would provide excellent selectivity in the absence of backmixing.

EXAMPLE 3

A 79 weight percent copper-21 weight percent zirconium amorphous metallic piece was prepared as a ribbon by quenching in the manner previously described. Phase separation was allowed to occur by heating the homogeneous piece to 200° C. for a period of 2 hours, and then the zirconium-rich phase was removed by leaching in a hydrochloric acid solution. FIGS. 5 and 6 illustrate the finished article, wherein the zirconium-deficient phase is present in an irregular rodlike form having a rod thickness of about 1–2 microns and a slightly smaller rod spacing. The higher magnification scanning electron micrograph shows that the remaining copper-rich phase is rodlike but with spines projecting outwardly from the rods. These spines are particularly desirable in increasing the surface-to-volume ratio of the material. It is believed that such copper-zirconium extended surface area amorphous articles should be useful in catalytic processes presently employing Raney copper catalysts, such as automobile exhaust gas catalytic converters. It is further believed that the conversion efficiency of copper-zirconium articles of the present invention should be significantly greater than that of present catalysts due to the amorphous structure and extended surface area morphology.

EXAMPLE 4

An 82 weight percent copper-18 weight percent zirconium amorphous alloy was prepared and phase separated in the manner described in Example 3. The phase-separated piece was leached in ammonium hydroxide to remove the zirconium-deficient phase. The remaining piece was structurally integral, thereby demonstrating (in conjunction with Example 3) that both the zirconium-rich and zirconium-deficient phases are internally continuous.

EXAMPLE 5

An amorphous alloy having a composition of 34.7 weight percent nickel, 42.3 weight percent palladium and 23 weight percent phosphorus was prepared by ribbon quenching an alloy of the same composition. The amorphous piece was phase separated by heat treatment at 300° C. for three hours. Phase separation resulted in two phases, a nickel-rich phase and a palladium-rich phase, even though there are three elements included in the alloy. The nickel-rich phase was removed by etching the homogeneous amorphous piece in a solution of hydrochloric acid and hydrogen perioxide for four hours at ambient temperature. The resulting structure, illustrated in FIG. 7, has the appearance of an open-celled spongy material, but in fact the cellular boundaries are rigid metallic palladium-rich phase. The width of the sponge walls is about 0.5 microns, and the width of the open spaces is about 1 micron or less. Both palladium and nickel are excellent hydrogenation catalysts, and it is believed that surfaces or membranes of the materials of this Example 5 should give excellent results in catalytic applications such as the hydrogenation of dextrose to sorbitol, the hydrogenation of benzaldehyde to benzyl alcohol, and the hydrogenation of adiponitrile to hexamethylenediamine, for example.

EXAMPLE 6

An amorphous alloy of composition 45.6 weight percent iron, 45.6 weight percent palladium and 8.8 weight percent phosphorus was prepared by ribbon quenching an alloy of the same composition and then phase separating by heating the homogeneous alloy to 200° C. for 2 hours. One phase was leached away in a mixture of hydrochloric acid and hydrogen peroxide. Lengthening of the leaching time allowed variation in the weight removed from the piece, from 10 percent to 70 percent by weight. The resulting article had a spongy appearance in the scanning electron microscope.

EXAMPLE 7

An amorphous alloy of composition 32.9 weight percent lead, 6.5 weight percent antimony and 60.6 weight percent gold was prepared by ribbon quenching an alloy of the same composition and then phase separating at ambient temperature. One phase was removed by leaching in acetic acid to produce a rodlike structure of the remaining phase.

EXAMPLE 8

An amorphous alloy of composition 72.2 weight percent gold, 23.3 weight percent copper and 4.5 weight percent yttrium was prepared by ribbon quenching an alloy of the same composition and then phase separating by heating to 105° C. The copper-rich phase was removed by leaching in nitric acid so that 26 percent of the weight of the piece was removed. The resulting article had a mossy appearance in the scanning electron microscope.

EXAMPLE 9

An amorphous alloy of composition 22.3 weight percent copper, 69.2 weight percent gold, 8.5 weight percent lanthanium was prepared by ribbon quenching an alloy of the same composition and then phase separated by heating to 110° C. for periods of time of 8 to 300 hours. One phase, believed to be a copper-rich phase, was removed by leaching in nitric acid. Only portions of the piece showed extensive removal in nitric acid, and these portions had a mossy appearance.

It will now be appreciated that the present invention provides an extended surface area amorphous article and a process for its preparation. The extended surface area is achieved in a solid monolithic article having excellent structural integrity, so that it may be used as a membrane or where containment systems are not practical. The exposed surface is amorphous, and therefore has significant advantages in applications such as catalysis. Although a particular embodiment of the invention has been described in detail for purposes of illustration, various modifications may be made without departing from the spirit and scope of the invention. Accordingly, the invention is not to be limited except as by the appended claims.

What is claimed is:

1. A process for preparing an extended surface area, amorphous metallic article, comprising the steps of:
    preparing a piece of a homogeneous, solid solution amorphous metallic alloy, the alloy having a composition associated with a eutectic reaction between at least two solid phases;
    phase separating the homogeneous alloy at a temperature which is below the crystallization temperature of the composition and is also below the spinodal temperature of the composition, for a time sufficent to form two distinct yet interconnected solid phases within the piece, the solid phases each being internally continuous, amorphous and in communication with the surface of the piece; and
    removing a portion of one solid phase, thereby exposing to the ambient environment an amount of surface of the remaining solid phase that is greater than the corresponding gross surface area of the piece, said step of removing to occur after said step of phase separating.

2. The process of claim 1, wherein substantially all of one phase is removed through the entire thickness of the piece, in said step of removing, to produce a porous amorphous solid article.

3. The process of claim 1, wherein said step of removing is accomplished by leaching out one phase.

4. The process of claim 1, wherein the amorphous alloy is of an alloy system selected from the group consisting of aluminum-silver, copper-zirconium, nickel-palladium-phosphorus, iron-palladium-phosphorus, lead-antimony-gold, gold-copper-yttrium, and copper-gold-lanthanum.

5. The process of claim 1, wherein said step of phase separating is accomplished by heating the piece.

6. The process of claim 1, wherein at least one of the solid phases formed in said step of phase separating is of an irregular lamellar morphology.

7. The process of claim 1, wherein at least one of the solid phases formed in said step of phase separating is of a rodlike morphology.

8. An article prepared by the process of claim 1.

9. An article prepared by the process of claim 2.

10. A multiphase article, comprising:
    a first internally continuous, amorphous metallic phase, said first phase communicating with the gross surface of said article; and
    a second internally continuous, nonsolid phase, said second phase communicating with the gross surface of said article.

11. A multiphase article, comprising:
    a first internally continuous, amorphous metallic phase, said first phase communicating with the gross surface of said article;
    a second internally continuous, nonsolid phase, said second phase communicating with the gross surface of said article; and
    a third internally continuous, amorphous metallic phase.

12. The article of claim 11, wherein the minimum dimension of said first phase is less than about 2 microns.

13. The article of claim 11, wherein the spacing between pieces of the first phase is less than 1 micron.

* * * * *